United States Patent
Jahn et al.

(10) Patent No.: US 8,150,545 B2
(45) Date of Patent: Apr. 3, 2012

(54) POSITION-DEPENDENT COMPLIANCE COMPENSATION IN A MACHINE TOOL

(75) Inventors: Dirk Jahn, Erlangen (DE); Rouven Meidlinger, Aachen (DE); Mirco Vitr, Aachen (DE)

(73) Assignee: Siemens Aktiengesellschaft, Munich (DE)

( * ) Notice: Subject to any disclaimer, the term of this patent is extended or adjusted under 35 U.S.C. 154(b) by 196 days.

(21) Appl. No.: 12/375,304

(22) PCT Filed: Jul. 28, 2006

(86) PCT No.: PCT/DE2006/001320
§ 371 (c)(1),
(2), (4) Date: Nov. 17, 2009

(87) PCT Pub. No.: WO2008/011845
PCT Pub. Date: Jan. 31, 2008

(65) Prior Publication Data
US 2010/0121478 A1    May 13, 2010

(51) Int. Cl.
*G06F 19/00* (2011.01)
*G01C 9/00* (2006.01)
*G06G 7/48* (2006.01)
*G06F 9/45* (2006.01)

(52) U.S. Cl. ........ 700/173; 700/159; 700/183; 700/189; 700/190; 700/191; 700/192; 700/193; 700/194; 700/204; 702/150; 703/7; 703/22

(58) Field of Classification Search .......... 700/173, 700/183, 159, 189–194, 204; 702/150; 703/7, 703/22

See application file for complete search history.

(56) References Cited

U.S. PATENT DOCUMENTS

| | | | | |
|---|---|---|---|---|
| 4,128,794 A | * | 12/1978 | Burleson | 318/603 |
| 4,509,126 A | * | 4/1985 | Olig et al. | 700/173 |
| 5,479,353 A | | 12/1995 | Nakamura | |
| 5,691,909 A | * | 11/1997 | Frey et al. | 700/159 |
| 5,796,620 A | * | 8/1998 | Laskowski et al. | 700/197 |

(Continued)

FOREIGN PATENT DOCUMENTS

| | | |
|---|---|---|
| DE | 3839030 A1 | 5/1990 |
| DE | 19859360 C2 | 7/2003 |
| DE | 10247309 A1 | 4/2004 |
| DE | 10312025 A1 | 10/2004 |

OTHER PUBLICATIONS

Lie et al., "Current-Sensor based Beed Cutting Force Intelligent Estimation and Tool Wear Condition Monitoring", 2000, IEEE, p. 697-702.*

*Primary Examiner* — Albert Decady
*Assistant Examiner* — Thomas Stevens
(74) *Attorney, Agent, or Firm* — Henry M. Feiereisen; Ursula B. Day

(57) ABSTRACT

A method and a device for position-dependent compliance compensation in a machine tool is disclosed. The compliance of the machine tool is derived at a position of a tool of the machine tool from machine data stored in memory, a machining force acting on the tool during a machining process at this position is determined, and at least one machining parameter that has an influence on the machining process is derived at this position in dependence on the derived compliance and the machining force so as to counteract a displacement of the tool with respect to a desired position caused by the compliance of the machine tool and the machining force. This optimizes the machining time and/or contour fidelity when machining a workpiece with a machine tool.

30 Claims, 2 Drawing Sheets

U.S. PATENT DOCUMENTS

| | | | | |
|---|---|---|---|---|
| 6,060,854 A * | 5/2000 | Yutkowitz | .................... | 318/632 |
| 6,604,015 B2 * | 8/2003 | Iriguchi et al. | ................ | 700/187 |
| 7,206,657 B2 * | 4/2007 | Esterling | ...................... | 700/175 |
| 7,218,995 B2 * | 5/2007 | Jahn et al. | ..................... | 700/259 |
| 7,747,421 B2 * | 6/2010 | Tang et al. | ........................ | 703/7 |
| 2007/0046677 A1 * | 3/2007 | Hong et al. | .................. | 345/442 |

* cited by examiner

POSITION-DEPENDENT COMPLIANCE COMPENSATION IN A MACHINE TOOL

BACKGROUND OF THE INVENTION

The invention relates to a device and method for compensating a machine tool's position-dependent compliance, to a machine tool that includes a device of said type, and to a computer program for implementing a method of the cited kind.

A compromise between as short as possible machining time and as high as possible finishing accuracy often has to be accepted when workpieces are machined, in particular cut, by means of a machine tool. The production process is basically designed such that a minimally required finishing accuracy will be maintained everywhere on the workpiece being machined and at all times during machining. Given these boundary conditions, maximum possible feed rates and cutting parameters must be targeted for the machine tool in order to ensure as economical as possible production.

Said maximum possible parameters depend substantially on the machine tool used. For example, parameters such as feed rates, cutting depths, tools employed etc. and the process forces resulting therefrom will impact substantially on the achieved contour fidelity depending on the machine tool's rigidity.

The machine's rigidity is as a rule dependent on the current positioning of the machine tool's axes or, expressed another way, on the tool's current position within the machine's operating space. Rigidity or, as the case may be, its reciprocal, compliance, will hence vary during a machining operation during which what is termed the tool center point (TCP) moves within the operating space. Clearly visible contour deviations can consequently occur while a workpiece is being machined if constant parameters for feed rate, cutting depth and spindle speed are used during machining. A pre-specified contour fidelity can nonetheless be achieved by dimensioning the cited machining parameters taking account of the machine tool's greatest compliance.

SUMMARY OF THE INVENTION

The object of the invention is to enable as short as possible machining time or as great as possible contour fidelity while a workpiece is being machined by means of a machine tool.

Said object is achieved by means of a method for compensating a machine tool's position-dependent compliance having the following method-related steps:

deriving the machine tool's compliance at a position of a tool of the machine tool from machine data stored in a memory, determining a machining force acting upon the tool during a machining process at said position, modifying at least one machining parameter affecting the machining process for said position as a function of the derived compliance and the machining force in such a way that a displacement of the tool with respect to a setpoint position due to the machine tool's compliance and the machining force will be counteracted.

The object is further achieved by means of a computer program for implementing said method.

The object is furthermore achieved by means of a device for compensating a machine tool's position-dependent compliance having:

a memory for machine data, deriving means for deriving the machine tool's compliance at a position of a tool of the machine tool from the machine data, determining means for determining a machining force acting upon the tool during a machining process at said position, modifying means for modifying at least one machining parameter affecting the machining process for said position as a function of the derived compliance and the machining force in such a way that a displacement of the tool with respect to a setpoint position due to the machine tool's compliance and the machining force will be counteracted.

The object is furthermore achieved by means of a machine tool having a device of the cited kind.

The invention is based on the knowledge that a machine tool's machining time can be significantly reduced while at the same time maintaining a pre-specified contour fidelity if machining parameters determining the machining process are varied as a function of the machine tool's compliance at a specific position of the tool during the machining process. By taking account of the machine tool's position-dependent compliance during the machining process it is possible to significantly reduce the displacement of the tool's tool center point and hence the deviation from a pre-specified contour as compared with present-day machine tools in the case of which the position dependency of the machine tool's compliance is not taken into account.

The machine tool's compliance is first derived for a specific position of the tool based on the machine data so that at least one of said machining parameters can be modified in a targeted manner. The machine data can be, for example, a three-dimensional machine model from which the machine tool's rigidity or compliance as a function of the position either proceeds directly or can be derived therefrom. If the compliance at said position is known, then the machining force acting upon the tool at said position will furthermore be determined. The machining force can be determined in advance through simulation and/or calculation, or it can alternatively be ascertained using measuring techniques.

If the force and compliance at said position are known, it will be possible to determine a notional displacement of the tool with respect to a setpoint position thereof that can be counteracted through suitably modifying at least one of the impacting machining parameters. The notional displacement would occur without any modifying of the machining parameters.

In an advantageous embodiment of the invention, the machine tool is provided for cutting operations. Cutting operations require adherence to minimum requirements placed on contour fidelity, something that is made very difficult because of wide variations in compliance within the machine tool's operating range and will be at the expense of operating time if the position dependency of the machine tool's compliance does not impact on the machining parameters. The machining parameter(s) will be modified compliance-dependently during the machining process by the inventive method, the result of which will be a substantial reduction in machining time.

Various values are possible for the position-dependent and hence compliance-dependent machining parameter requiring to be modified. In an advantageous embodiment variant of the invention, the machining parameter is a setpoint value for the tool position that is pre-specified by a control program, in particular an NC program. A displacement due to changing machine tool compliance can be effectively counteracted by changing the setpoint value for the tool position.

As an alternative thereto, an advantageous embodiment variant of the invention is characterized in that the machining parameter is a feed rate value or a cutting depth or a spindle speed.

Position-dependently and compliance-dependently modifying a plurality of different machining parameters during the machining process is of course also advantageous and encompassed by the invention.

There are also several possibilities for obtaining the machine data serving as the basis for deriving the individual compliance values within the machine's operating space. One advantageous embodiment variant of the invention is characterized in that the machine data is obtained by simulating the machine tool's rigidity characteristics. For machine tools there are generally three-dimensional machine models that can already be produced at the machine tool's design stage and from which rigidity values of said kind can be ascertained. Finite element simulations are typically performed therefor.

Another advantageous embodiment of the invention is characterized in that the machine data is ascertained using measuring techniques. For increasing accuracy it is also conceivable for the machine data to be ascertained using both a measuring technique and a simulation technique.

In another advantageous embodiment of the invention, the machine data includes discrete compliance values at discrete points within the machine tool's operating space.

In another advantageous embodiment of an embodiment variant of said kind, the machine tool's compliance at said position is derived by interpolating the compliance values. For example, linear extrapolating will also make it possible to ascertain compliance values for positions within the machine tool's operating space that are not included in the machine data stored in the memory.

There are also several possibilities for determining the machining force. For example, one advantageous embodiment of the invention is characterized in that the machining force is measured by means of a force sensor.

An advantageous alternative or additional embodiment variant of the invention is one in which the machining force is determined by measuring drive currents of the machine tool and a calculation of the machining force is determined from the measured drive currents.

In another advantageous embodiment of the invention, the machining force can furthermore be determined by performing a process simulation of the machining process.

In an advantageous embodiment of the invention, the machining parameter can be modified before a workpiece is machined. The position-dependent values for the machine tool's compliance and the machining force must therein be ascertained in advance in order, for example, to appropriately modify in advance an NC program provided for controlling the machining process. For example, setpoint values determining the contour curve can in that way be adjusted ahead of the machining process taking the position-dependent compliance into account.

An advantageous alternative or additional embodiment variant of the invention is one in which the machining parameter is modified while a workpiece is being machined. The compliance values within the machine's operating space are therein expediently also first determined in advance by means of simulating or measuring. The machining force acting upon the tool while the workpiece is being machined is, though, determined online so that during the machining process a displacement of the tool center point ensuing therefrom can be calculated that is counteracted likewise online by suitably modifying the machining parameter.

BRIEF DESCRIPTION OF THE DRAWING

The invention is described and explained in more detail below with reference to the exemplary embodiments shown in the figures, in which.

DETAILED DESCRIPTION OF PREFERRED EMBODIMENTS

Figure 1:
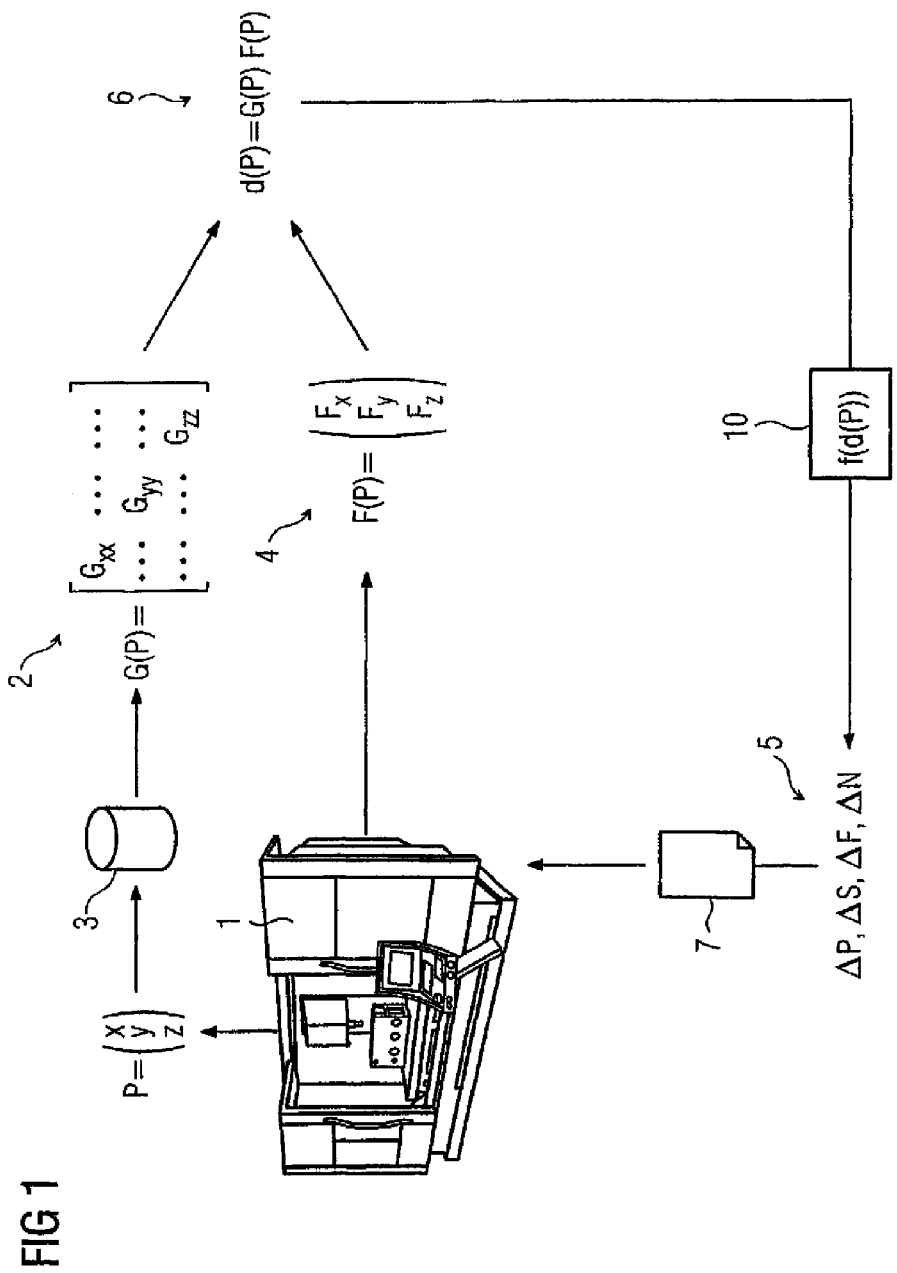
FIG. 1 is a schematic representation of a method for compensating a machine tool's position-dependent compliance and FIG. 2 shows a method for compensating a machine tool's position-dependent compliance with a machining force being calculated from measured drive currents.

FIG. 1 is a schematic representation of a method for compensating a position-dependent compliance 2 of a machine tool 1. The compliance 2 is compensated as a function of the tool within the operating space of the machine tool 1 through online adjusting of machining parameters 5 that impact on the contour requiring to be traveled along during the machining process. For each point P through which the tool travels during the machining process a compliance matrix 2 is ascertained using machine data 3 stored in a memory. The compliance matrix 2 can be ascertained online during the machining process or even ahead of the machining process so that the values will already be available when the workpiece is machined.

A machining force 4 is furthermore determined in the form a machining vector F for each position P requiring to be assumed by the tool. From the compliance matrix G and machining vector F for the current point P it is finally possible to determine a displacement d of the workpiece or, as the case may be, its tool center point by multiplying said variables. The aim of compensating is to keep said displacement 6 as small as possible. For that purpose it is ascertained via a suitable modification function 10 how one or more machining parameters 5 are to be modified in order to keep the displacement 6 as small as possible or to ensure that the displacement 6 will not exceed a pre-specified maximum value. The machining parameters 5 are, for example, a setpoint value, pre-specified in the NC program 7, for the tool position, the current cutting depth, a current value for the feed rate, or the spindle speed of the machine tool 1.

The special feature of the method being presented is that the machining parameters 5 are adjusted online as a function of the compliance of the machine tool 1 and of the force 4 acting upon the tool. A minimum machining time can be achieved thereby if the contour fidelity has been pre-specified or the contour fidelity improved thereby if the time is constant.

Figure 2:
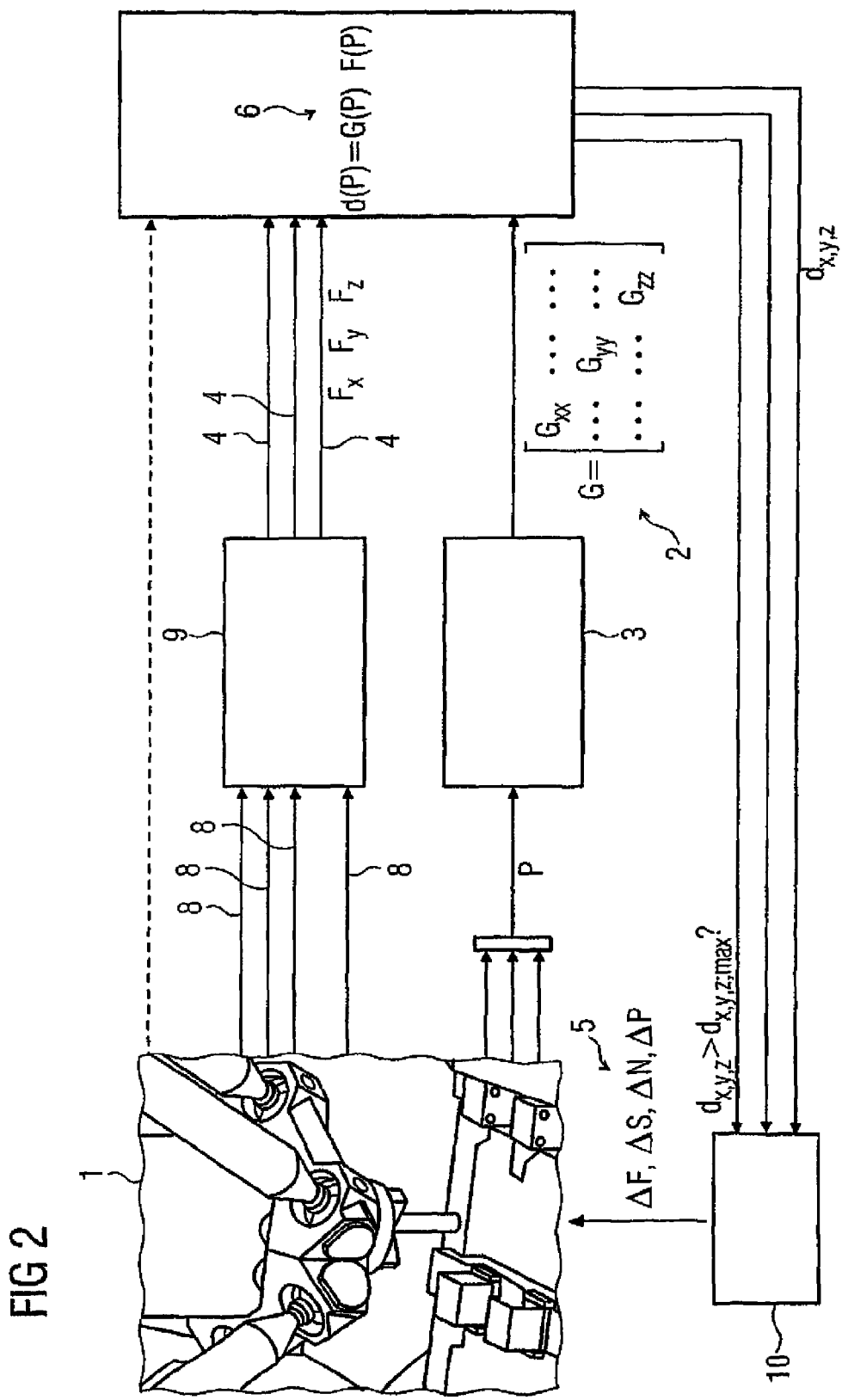

FIG. 2 shows a method for compensating a position-dependent compliance 2 of a machine tool 1 with a machining force 4 being calculated from measured drive currents 8. One scenario for using integrated position-dependent compliance compensation of said kind is as follows:

The compliance 2 in the form of a compliance matrix can be ascertained for each position P online during the machining process from machine data 3 present in the form of a rigidity model, determined once in advance, of the operating space of the machine tool 1. The model for determining the position-dependent compliance 2 is by contrast determined independently of subsequent machining once only specifically for the relevant machine tool and its configuration by means of, for example, simulation or measuring of the entire operating space.

For machining a workpiece the operator loads a desired control program in the form of an NC program. In the control of the machine tool 1 the operator furthermore activates an instruction that activates the position-dependent compliance compensation. Alternatively, the position-dependent compliance compensation is invoked automatically when the NC program is launched.

The control then executes the NC program taking the machine compliance into account. That takes place as follows for different points P to which the tool travels:

With the aid of the model for determining the position-dependent compliance 3, the compliance matrix 2 is first determined for the position P that is traveled to. The drive currents 8 consisting of three axle currents and one spindle current are furthermore ascertained at said operating point P through current measuring. Using a process force model 9 it is possible to ascertain the forces 4 acting upon the tool 1 at the current position P from the measured drive currents 8. The result is three force components $F_x$, $F_y$, $F_z$ for the three spatial dimensions. A displacement of the tool relative to all three spatial dimensions can then be determined from the force vector F resulting therefrom and from the determined compliance matrix 2.

A check is then carried out to determine whether the displacement 6 exceeds a pre-specified maximum value either in terms of amount or relative to one of the three spatial dimensions. If it does, a modification function 10 will be activated that will modify at least one machining parameter 5 in such a way that such kind of displacement 6 of the tool or, as the case may be, tool center point can be counteracted. Modifying can be performed by, for example, changing the NC program required for controlling. Alternatively, the setpoint drive values can also be modified directly. Instances of machining parameters 5 requiring to be modified are the feed rate of the machine tool 1, the cutting depth, the spindle speed, and setpoint values, initially pre-specified in the NC program, for the contour along which the tool is to travel.

As an alternative to what has been shown, namely calculating the machining force 4 from the drive currents 8, it is also conceivable and encompassed by the invention to ascertain the machining force 4 directly using measuring techniques. The overall calculating time for performing compliance compensation can in that way be somewhat reduced and the accuracy of the force values possibly improved.

What is claimed is:

1. A method for compensating a position-dependent compliance of a machine tool, comprising the steps of:
   deriving from stored machine data the position-dependent compliance of the machine tool at a tool position of a tool of the machine tool,
   determining a machining force acting upon the tool during a machining process at the tool position, and
   modifying, depending on the derived position-dependent compliance and the determined machining force, at least one machining parameter affecting the machining process at the tool position so as to counteract a displacement of the tool from a desired tool position caused by the position-dependent compliance of the machine tool and the machining force.

2. The method of claim 1, wherein the machine tool is provided for cutting operations.

3. The method of claim 1, wherein the at least one machining parameter is a value of the desired tool position specified in a control program.

4. The method of claim 3, wherein the control program is a NC program.

5. The method of claim 1, wherein the at least one machining parameter is a feed rate value or a cutting depth or a spindle speed.

6. The method of claim 1, wherein stored machine data is determined from a simulation of a rigidity characteristic of the machine tool.

7. The method of claim 1, wherein stored machine data are determined from a measurement.

8. The method of claim 1, wherein the stored machine data include discrete compliance values at discrete locations within a workspace of the machine tool.

9. The method of claim 8, wherein the position-dependent compliance of the machine tool at an arbitrary location is derived by interpolating between the discrete compliance values.

10. The method of claim 1, wherein the machining force is measured with a force sensor.

11. The method of claim 1, further comprising the steps of:
    measuring drive currents of the machine tool, and determining the machining force from the measured drive currents.

12. The method of claim 1, further comprising the steps of:
    performing a process simulation of the machining process, and determining the machining force from the process simulation.

13. The method of claim 1, wherein the at least one machining parameter is modified before machining of a workpiece.

14. The method of claim 1, wherein the at least one machining parameter is modified during machining of a workpiece.

15. A device for compensating a position-dependent compliance of a machine tool, comprising:
    a memory storing machine data,
    a compliance deriving unit which derives from stored machine data the position-dependent compliance of the machine tool at a tool position of a tool of the machine tool,
    a force determining unit which determines a machining force acting upon the tool during a machining process at the tool position, and
    a machining parameter modifying unit which determines, depending on the position-dependent compliance received from the compliance deriving unit and the machining force received from the force determining unit, at least one machining parameter affecting the machining process at the tool position so as to counteract a displacement of the tool from a desired tool position caused by the position-dependent compliance of the machine tool and the machining force.

16. The device of claim 15, wherein the machine tool is a cutting machine tool.

17. The device of claim 15, wherein the at least one machining parameter is a value of the desired tool position specified in a control program.

18. The method of claim 17, wherein the control program is a NC program.

19. The device of claim 15, wherein the at least one machining parameter is a feed rate value or a cutting depth or a spindle speed.

20. The device of claim 15, wherein the stored machine data are determined from a simulation of a rigidity characteristic of the machine tool.

21. The device of claim 15, wherein the stored machine data are determined from a measurement.

22. The device of claim 15, wherein the stored machine data include discrete compliance values at discrete locations within a workspace of the machine tool.

23. The device of claim 22, wherein the deriving means are configured to derive the position-dependent compliance of the machine tool at an arbitrary location by interpolating between the discrete compliance values.

24. The device of claim 15, wherein the determining means include a force sensor for measuring the machining force.

25. The device of claim 15, wherein the determining means comprise a current sensor measuring a drive current of the machine tool and a calculating unit calculating the machining force from the measured drive current.

26. The device of claim 15, further comprising a simulator performing a process simulation of the machining process, wherein the determining means determine the machining force from the process simulation.

27. The device of claim 15, wherein the modifying means modify the at least one machining parameter before machining a workpiece.

28. The device of claim 15, wherein the modifying means modify the at least one machining parameter during machining a workpiece.

29. A machine tool comprising a device for compensating a position-dependent compliance, the device comprising:
a memory storing machine data,
a compliance deriving unit which derives from stored machine data the position-dependent compliance of the machine tool at a tool position of a tool of the machine tool,
a force determining unit which determines a machining force acting upon the tool during a machining process at the tool position, and
a machining parameter modifying unit which determines, depending on the position-dependent compliance received from the compliance deriving unit and the machining force received from the force determining unit, at least one machining parameter affecting the machining process at the tool position so as to counteract a displacement of the tool from a desired tool position caused by the position-dependent compliance of the machine tool and the machining force.

30. A computer program, stored on a non-transitory computer readable, which enables a computer, after the computer program is loaded into a computer, to execute a method for compensating a position-dependent compliance of a machine tool, the method comprising the steps of:
deriving from stored machine data the position-dependent compliance of the machine tool at a tool position of a tool of the machine tool, determining a machining force acting upon the tool during a machining process at the tool position, and
modifying, depending the derived position-dependent compliance and the determined machining force, at least one machining parameter affecting the machining process at the tool position so as to counteract a displacement of the tool from a desired tool position caused by the position-dependent compliance of the machine tool and the machining force.

* * * * *